No Printed Specification Available
5714X
E. Berry,
Washing Machine,
Patented Nov. 12, 1829.
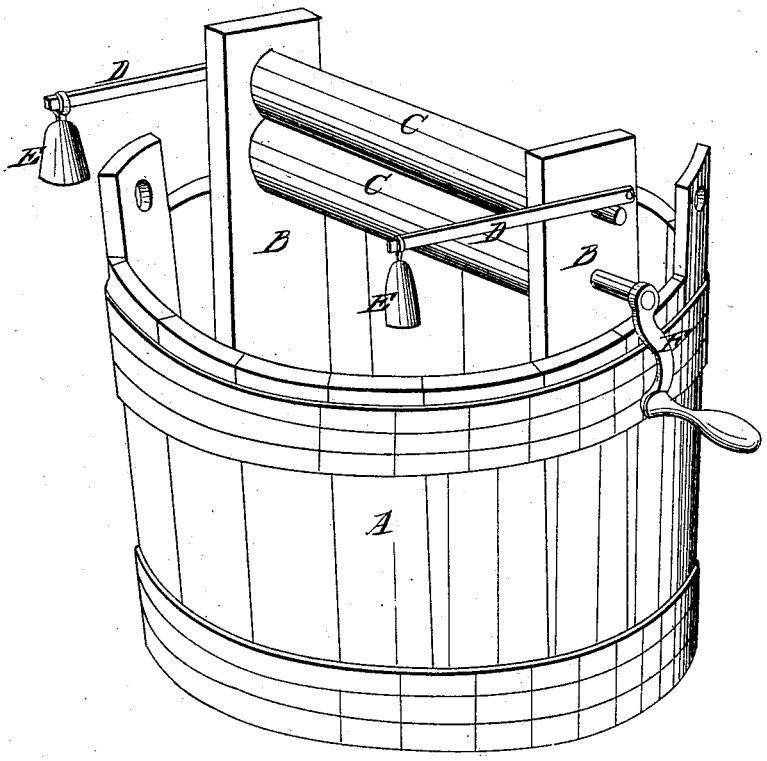
N. PETERS. PHOTO-LITHOGRAPHER, WASHINGTON, D.C.

United States Patent Office

PTO - BOYERS, PA Duty Station

MISSING PAGE TEMPORARY NOTICE

PATENT # 5714 X FOR ISSUE DATE 11-12-1829

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Text

Data Conversion Operation

Boyers, Pa